United States Patent
Neary

(10) Patent No.: US 7,269,722 B1
(45) Date of Patent: Sep. 11, 2007

(54) PREVIEW OF UNIX BOOT PROCESS FROM MULTI-USER LEVEL

(75) Inventor: Paul P. Neary, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 425 days.

(21) Appl. No.: 10/898,798

(22) Filed: Jul. 26, 2004

(51) Int. Cl.
  *G06F 15/177* (2006.01)
(52) U.S. Cl. .............................. 713/1; 717/177; 703/22
(58) Field of Classification Search ............... None
  See application file for complete search history.

(56) References Cited

U.S. PATENT DOCUMENTS

| | | | |
|---|---|---|---|
| 6,272,626 B1 | 8/2001 | Cobbett | |
| 7,130,786 B2 * | 10/2006 | Grebenev | 703/22 |
| 2005/0229175 A1 * | 10/2005 | McCrory et al. | 717/177 |

OTHER PUBLICATIONS

GreenLine Introduction (4.1; Mar. 8, 1928) Sun Microsystems, Inc., Commitment draft, 2002-2003, pp. 1-5.

Van Hoogeveen, J., et al Container/Zones Functionality (Kevlar) Marketing Requirements Document, Feb. 26, 2002, pp. 1-8.

* cited by examiner

*Primary Examiner*—Rehana Perveen
*Assistant Examiner*—Fahmida Rahman
(74) *Attorney, Agent, or Firm*—Meyertons Hood Kivlin Kowert & Goetzel, P.C.; B. Noël Kivlin

(57) ABSTRACT

A system and method for previewing a reboot. In one embodiment the method comprises modifying a configuration of a computer system and previewing a reboot, wherein previewing the reboot comprises comparing a current configuration of the computer system to a predicted configuration of the computer system. In an additional embodiment, the method may further comprise determining errors in the current configuration of the computer system by comparing the current configuration of the computer system to the predicted configuration of the computer system. The system incorporates the idea of a "preview" boot mode for both the operating system and it resource scripts and resources. Application of this method allows the risks associated with boot processes to be safely determined a priori. The method also allows an "instantaneous" reboot by swapping actual data structures and resources with predicted data structures and resources of the live system.

9 Claims, 8 Drawing Sheets

PREVIEW OF UNIX BOOT PROCESS FROM MULTI-USER LEVEL

BACKGROUND OF THE INVENTION

1. Field of the Invention

This invention relates to the field of computer systems and, more particularly, to reboot operations in computer systems.

2. Description of the Related Art

As computer systems become increasingly important to modern business and industry, maintaining key systems at a high level of availability becomes increasingly critical. For example, one definition of so-called "high-availability" systems is a system which is fully functional 99.999% of the time, or a system which is unavailable less than ten minutes each year. Accordingly, many maintenance and upgrade procedures that would traditionally be verified by restarting or "rebooting" a computer system are now completed without a reboot, thereby avoiding any downtime which would decrease system availability.

Dispensing with a verification reboot of the system, subsequent to a system configuration change, means that modifications to the reboot are untested. Furthermore, multiple changes which affect the reboot process or the post-reboot configuration of a given server computer after a reboot may be made in the months or years between actual reboots of the server. For example, a system administrator may install software upgrades to the system network or upgrades to system before an intentional or unintentional system restart occurs.

An error made during such changes may place the system in an undesirable, unstable or non-functional state after a reboot. However, such a configuration error may be difficult to diagnose, since no clear indication may exist as to which modification or combination of modifications caused the error. Accordingly, system administrators may face a choice between high availability or frequent reboots for system verification purposes.

SUMMARY

A system and method for previewing a reboot is disclosed. In one embodiment the method comprises modifying a configuration of a computer system and previewing a reboot, wherein previewing the reboot comprises comparing a current configuration of the computer system to a predicted configuration of the computer system. In an additional embodiment, the method may further comprise determining errors in the current configuration of the computer system by comparing the current configuration of the computer system to the predicted configuration of the computer system.

In a further embodiment, previewing the reboot may comprise executing one or more resource scripts in a preview mode, wherein said scripts are operable to output one or more configuration parameters when executed in the preview mode, and comparing the one or more configuration parameters to one or more configuration parameters of the current configuration of the computer system.

In another embodiment, previewing the reboot may comprise initiating one or more clone resource processes and comparing the one or more clone resource processes to one or more resource processes. In a further embodiment, initiating the one or more clone resource processes may comprise determining one or more dependent clone resource processes that are dependent on one or more independent clone processes based on a dependency graph, initiating the one or more independent clone processes, and initiating the one or more dependent clone processes In an additional embodiment, previewing the reboot may further comprise executing an operating system kernel in a preview mode. In one embodiment executing the kernel in the preview mode may comprise bypassing one or more system calls that would otherwise be executed during the reboot and comparing the parameters which would have been passed to the bypassed system calls to data structures in the current configuration of the computer system.

In still another embodiment, executing the kernel in the preview mode may comprise executing one or more system calls, wherein the one or more system calls modify one or more clone data structures, and comparing the one or more clone data structures to data structures in the current configuration of the computer system. In a further embodiment, one or more clone processes may be initiated by the operating system kernel executing in the preview mode. In another further embodiment, the method may further comprise replacing the data structures in the current configuration with the clone data structures and replacing the one or more resource processes with the one or more clone resource processes.

In yet another embodiment, previewing the reboot may comprise creating a virtual copy of the computer system, wherein the virtual copy has the current configuration of the computer system, executing a reboot of the virtual copy of the computer system, and comparing a configuration of the rebooted virtual copy to the current configuration of the computer system.

Figure 1:
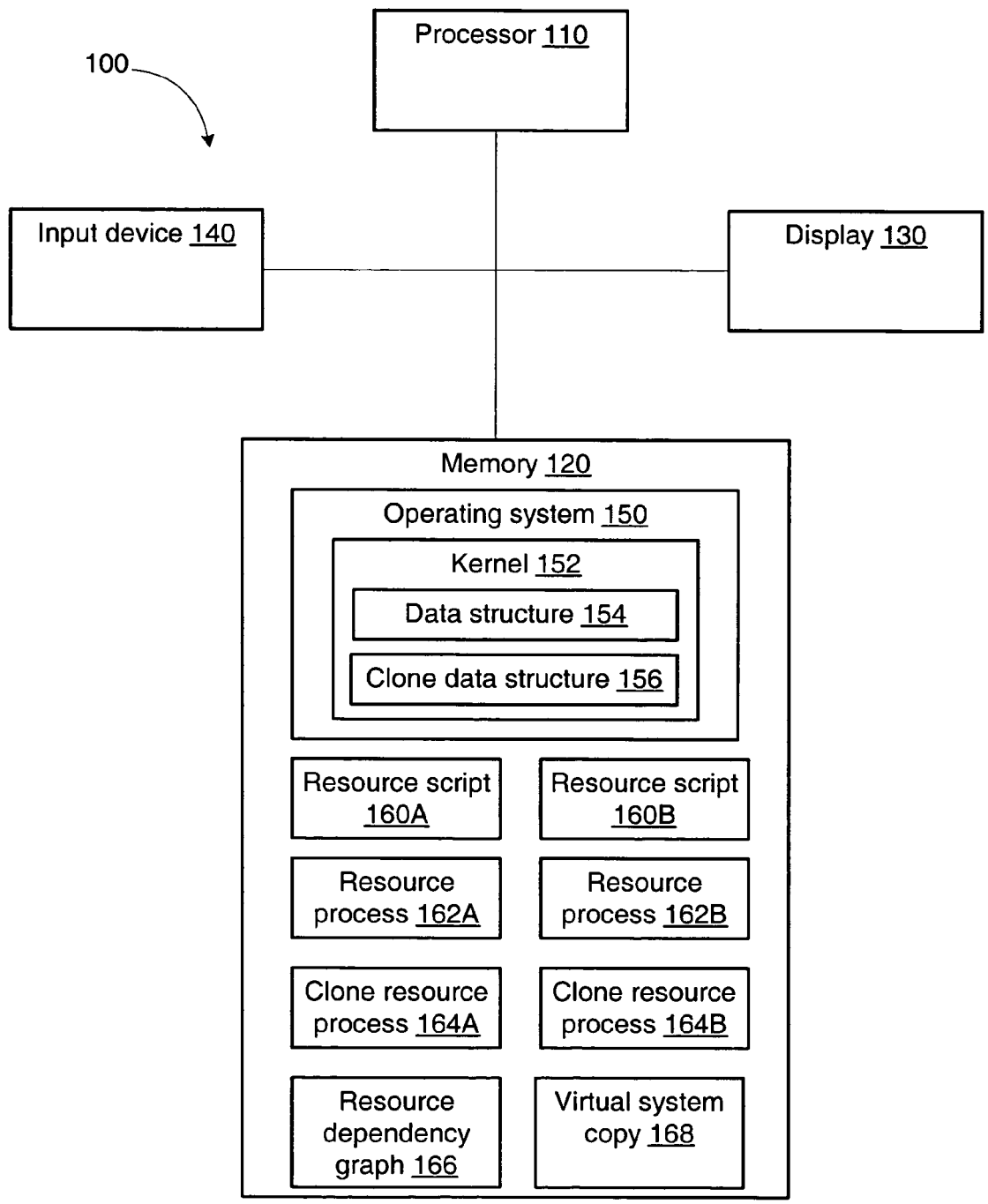
FIG. 1 is an illustration of an exemplary computer system for implementing certain embodiments.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a computer system 100 is shown. Computer system 100 includes a processor 110 coupled to a memory 120, an output device 130, and an input device 140. It is noted that computer system 100 may be representative of a laptop, desktop, server, workstation, terminal, or other type of system.

Processor 110 may be representative of any of various types of processors such as an x86 processor, a PowerPC processor or a CPU from the SPARC™ family of RISC processors. It is noted that in various embodiments computer system 100 may contain more than one processor 110.

Memory 120 may be representative of any of various types of memory, including DRAM, SRAM, EDO RAM, Rambus RAM, etc., or a non-volatile memory such as a magnetic media, e.g., a hard drive, flash memory or optical storage, for example. It is noted that in other embodiments, the memory 120 may include other types of suitable memory as well, or combinations of the memories mentioned above.

Output device 130 may be representative of any of various types of output devices, such as a liquid crystal display (LCD) or a cathode ray tube (CRT) display, for example. Input device 140 may be any type of suitable input device, as appropriate for a particular system. For example, the input device 140 may be a keyboard, a mouse, a trackball or a touch screen. It is noted that input device 140 and output devices 130 may be remotely connected to the computer system 100 via a physical network connection (such as Ethernet) or via a wireless network connection.

Memory 120 comprises an operating system 150 operable to manage computer system 100 and various hardware and software resources associated with the system. In various embodiments operating system may be a variant of Microsoft Windows™, Sun Solaris™, Linux, or other types of operating systems. Operating system 150 in turn comprises a kernel 152 operable to manage one or more software processes executing on computer system 100, as well as the initialization of various system resources during a reboot of computer system 100, as will be described in further detail below.

Kernel 152 may comprise one or more kernel-level data structures 154 operable to contain information on the current configuration of computer system 100. In some embodiments, kernel 152 may also comprise one or more clone data structures 156. Each clone data structure 156 may correspond to a specific data structure 154, and may have identical structure to the data structure 154.

Memory 120 further comprises one or more resource processes 162A-B (referred to generally as resource processes 162). Memory 120 may also comprise one or more clone resource processes 164A-B (referred to generally as clone resource processes 164). Each resource process 162 may correspond to a utilized software resource on computer system 100, such as a login daemon or a network file system. As will be described in further detail below, each clone resource process 164 may correspond to a currently executing resource process 162, but may execute on an offset network or service port or be associated with offset file descriptors, directories, or process identification numbers, for example. In some embodiments, each clone resource process 164 may be assigned no workload, and may exist only for the purposes of testing the reboot configuration of computer system 100.

Memory 120 also comprises one or more resource scripts 160A-B (referred to generally as resource scripts 160), each of which may be operable to start and initialize an associated resource process 162 or clone resource process 164 according to a set of configuration parameters associated with the script. Furthermore, as will be described in further detail below, in one embodiment one or more resource scripts 160 may be modified to execute in a preview mode, wherein the script may be operable to output one or more configuration parameters reflecting a speculative condition of an associated resource after a reboot.

Memory 120 may additionally comprise a resource dependency graph 166. Resource dependency graph 166 may be configured to indicate which resource processes 162 must be running for other resource processes 162 to be successfully initiated. In one embodiment dependency graph 166 may be part of a service or resource monitoring/control system, such as Greenline for Sun Solaris™.

Memory 120 may further comprise a system copy 168. System copy 168 may be a virtual copy of computer system 100, according to the current configuration of computer system 100. In one embodiment, system copy 168 may be a virtual machine executing on processor 110 in parallel with kernel 152. Alternatively, system copy 168 may be a container within operating system 150, such as the Zones functionality of Sun Solaris™.

As will be described in further detail below, in various embodiments computer system 100 may be operable to provide a preview of a reboot process by comparing a current configuration of the computer system to a predicted configuration of the computer system. Accordingly, computer system 100 may be operable to detect any negative side effects of a configuration change, and to allow a user to preemptively handle such side effects, without affecting the availability of the computer system.

Figure 2:
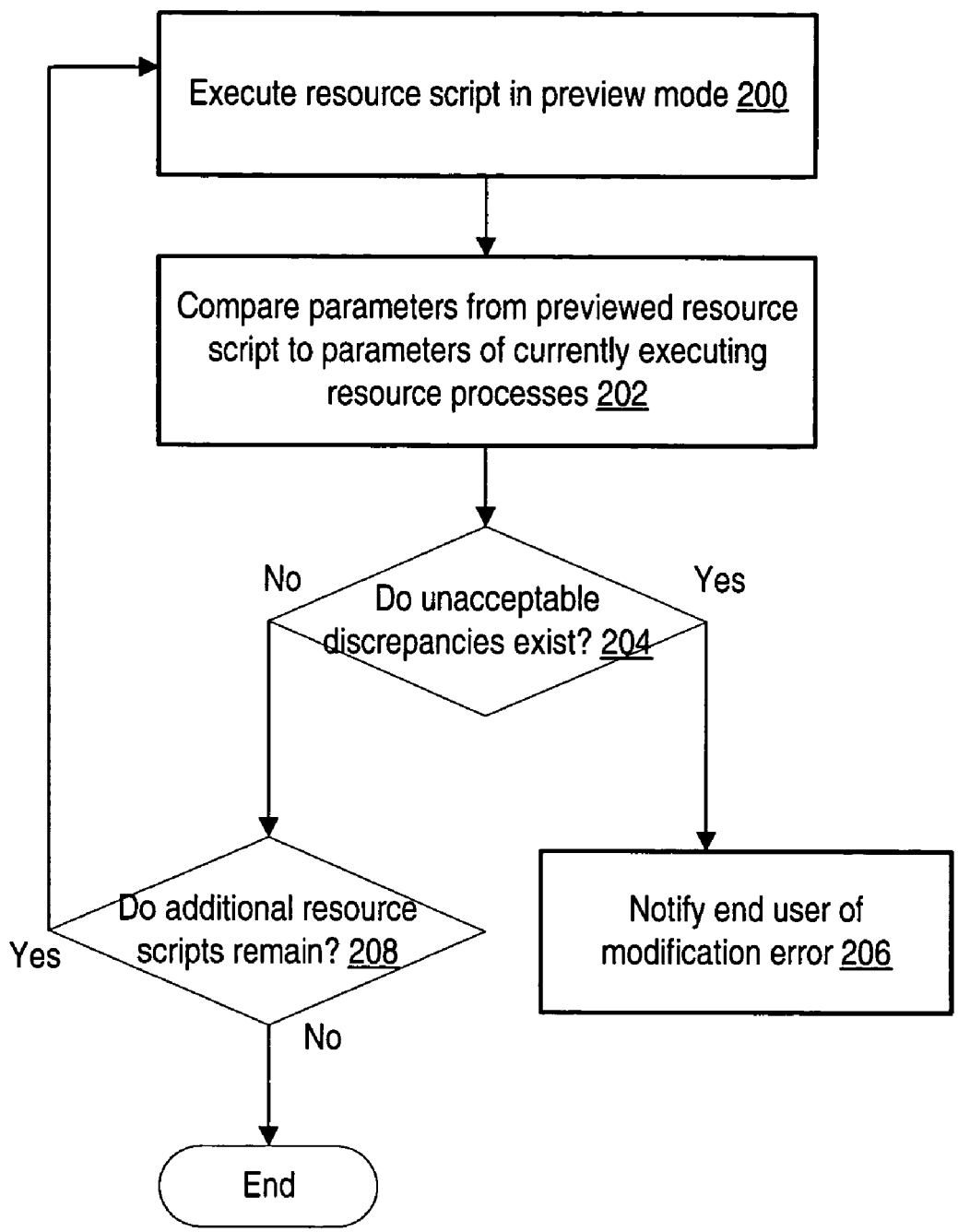
FIG. 2 is a flowchart illustrating previewing of a reboot with the use of a resource script, according to one embodiment.

Turning now to FIG. 2, one embodiment of a method for previewing a reboot is shown. In step 200, computer system 100 executes a resource script 160 in a preview mode, as described above. In one embodiment each resource script 160 may be operable to accept an input parameter indicating if the resource script should be run in preview mode, while in another embodiment a separate preview resource script 160 may be created based on an original resource script 160.

In step 202, one or more configuration parameters output from resource script 160 are compared to the state of a currently executing corresponding resource process 162. For example, in one embodiment a resource script 160 executing in preview mode may indicate that a network file system resource process 162 would be mounted in a given directory after a reboot. The directory given by the preview script may then be compared to the mount directory of the network file system resource process 162 currently executing on computer system 100.

In step 204, it is determined if unacceptable differences exist between the previewed parameters and the expected or actual parameters. In some embodiments the comparison may determine if the previewed parameters are precisely equal to the original or target parameters, while in other embodiments the previewed parameters are tested for equality within certain tolerances. For example, in one embodiment the comparison may disregard inequalities in certain parameters recently modified by an end user.

If unacceptable differences do exist in step 204, the method may advance to step 206, wherein an end user such as a system administrator is notified of the difference. Alternatively, if unacceptable differences do not exist, the method may advance to step 208, wherein it is determined if additional resource scripts 160 remain to be previewed. If additional resource scripts 160 do remain, another resource script 160 is selected and the method returns to step 200. If no additional resource scripts 160 remain, the method ends.

It is noted that in one embodiment, the steps of FIG. 2 may be carried out in a systematic manner by operating system 150, while in other embodiments the method may be executed by a system utility or by a system administrator on a script-by-script basis. It is further noted that in one embodiment, resource scripts 160 may continue to be previewed even after an unacceptable discrepancy is detected and an end user is notified in step 206.

Figure 3:
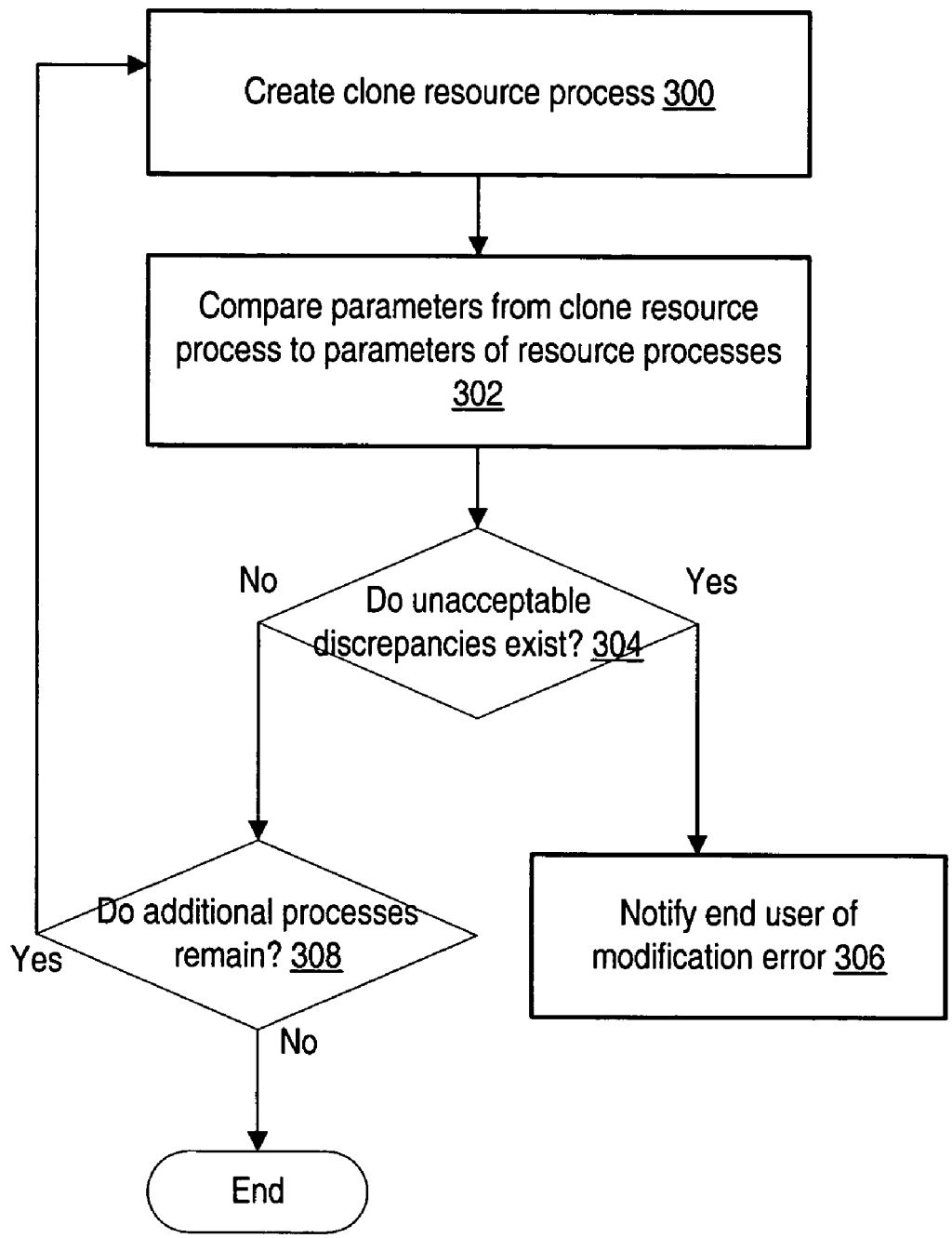
FIG. 3 is a flowchart illustrating previewing of a reboot with the use of a clone resource process, according to one embodiment.

Turning now to FIG. 3, another embodiment of a method for previewing a reboot is illustrated. As described in above in FIG. 2, a reboot may be previewed by executing one or more resource scripts 160 in a preview mode. However, rather than executing each resource script 160 in a preview mode, FIG. 3 describes a method wherein a clone resource process 164 is initiated and compared to a corresponding currently executing resource process 162, as will be described in further detail below.

In step 300, a clone resource process 164 is created and executes in parallel with an existing resource process 162. In one embodiment the clone resource process 164 may be started by a resource script 160 executing in a preview mode. Alternatively, in other embodiments the clone resource process 164 may be started by a system administrator or system utility. It is noted that in various embodiments, clone process 164 may be started by resource script 160 with, for example, a distinct process ID, different file handles, or offset directory, network or service port associations in comparison to the corresponding resource process 162.

In step 302, the configuration of the clone resource process 164 is compared to the currently executing resource process 162. In step 304, it is determined if unacceptable discrepancies exist based on the comparison of step 302. In some embodiments the comparison may determine if the configuration of the clone resource process 164 is precisely equal to the original resource process 162, while in other embodiments the configuration of the clone resource process 162 may be tested for equality within certain tolerances.

If unacceptable discrepancies are determined to exist in step 304, the method advances to step 306 wherein an end user is notified. If unacceptable discrepancies do not exist, the method advances to step 308 where it is determined if additional resources processes 162 remain to be tested. If additional resource processes 162 remain to be tested against clone resource processes 164, the method selects another resource process 162 and returns to step 300. If no additional resources processes remain, the method ends.

It is noted that in one embodiment, the steps of FIG. 3 may be carried out in a systematic manner by operating system 150, while in other embodiments the method may be executed by a system utility or by a system administrator on a resource-by-resource basis. It is also noted that in one embodiment clone resource processes 164 may continue to be created and compared to existing resource processes 162 even after an unacceptable discrepancy is detected and an end user is notified in step 306.

Figure 4:
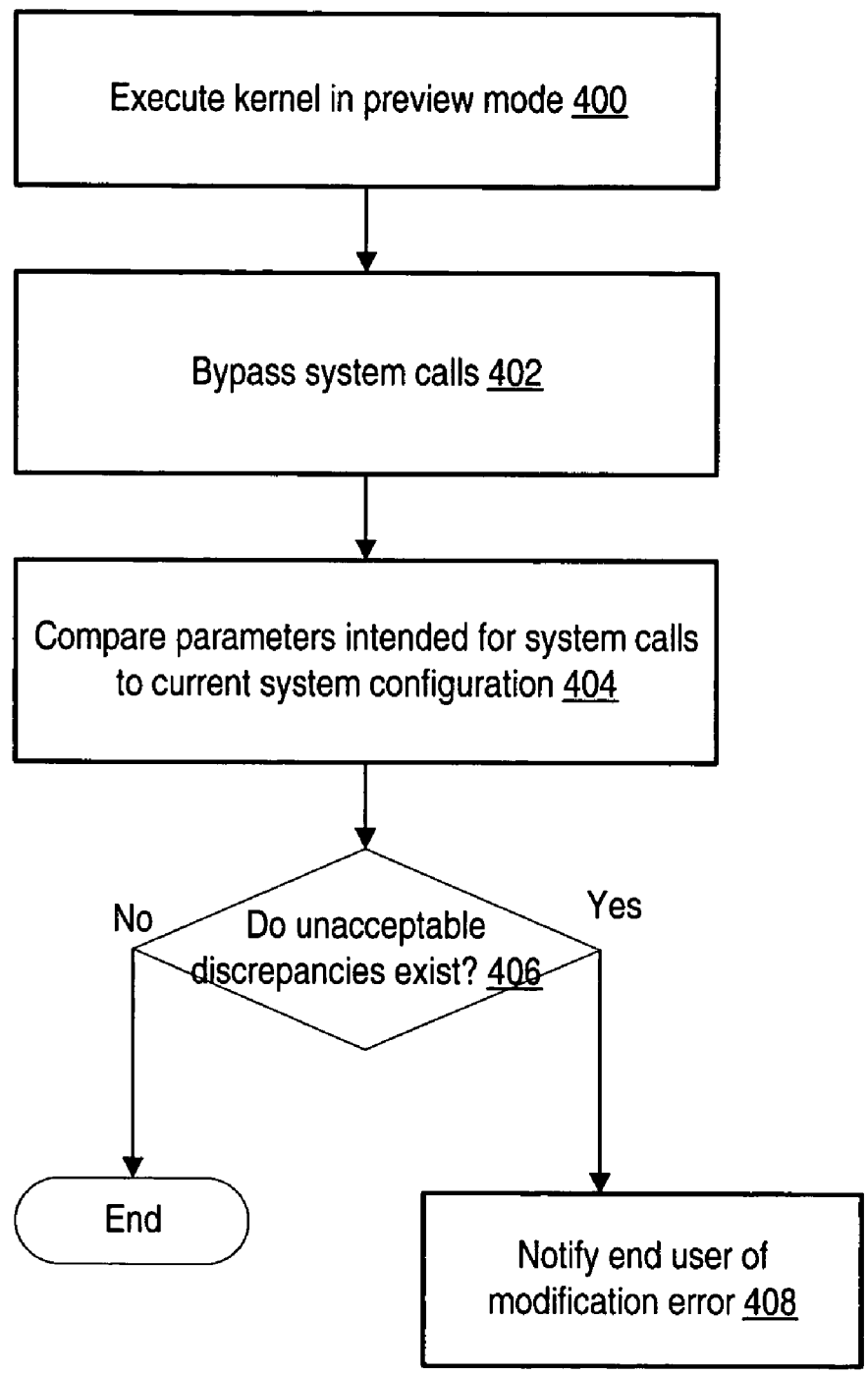
FIG. 4 is a flowchart illustrating previewing of a reboot with the use of a kernel running in preview mode, according to one embodiment.

FIG. 4 illustrates yet another embodiment of a method for previewing a reboot. Specifically, in some embodiments kernel 152 may be configured to execute in a preview mode which simulates the execution of the kernel during a bootup process. By comparing the operations of kernel 152 in preview mode to the current configuration of computer system 100, the method may be utilized to determine if any configuration changes have created unwanted configuration errors.

More particularly, the kernel preview mode may be operable to execute in parallel with the regular operation of kernel 152 in allocating resources and managing processes. In one embodiment, kernel 152 may be operable to execute in a multi-user mode, which may include managing a plurality of shared resources between users. The kernel may further be operable to simultaneously execute in the preview mode, wherein the kernel carries out the same operations as when booting up the computer system 100 and starting one or more resource processes 162 via one or more resource scripts 160. As will be described in further detail below, in one embodiment kernel 152 may bypass one or more state-changing system calls while executing in preview mode, thereby avoiding making any permanent changes to the state of computer system 100.

It is noted that, in one embodiment, kernel 152 may be operable to detect which mode it is currently executing in (i.e. multi-user or preview mode). Accordingly, the kernel may be able to handle various events such as device interrupts, exceptions and traps differently depending on the source of the event and what mode the kernel is currently executing in. For example, an exception received from a resource process 162 created by a resource script 160 initiated while the computer is in preview mode may be recorded for a system administrator's attention, but otherwise ignored. Alternatively, a hardware interrupt received from a resource process 162 unrelated to the preview of the reboot process may be handled by kernel 152 as usual. It is further noted that in some embodiments kernel 152 may execute the preview mode in parallel with other modes, such as a single-user mode.

In step 400, kernel 152 is executed in preview mode as described above. In one embodiment, the kernel may execute one or more resource scripts 160 in preview mode to obtain various resource parameters, as described above in FIG. 2. Alternatively, in another embodiment the kernel may execute one or more resource scripts 160 to create clone resource processes 164, as described above in FIG. 3. The kernel may further perform the comparison steps of FIG. 2 or 3 while executing in preview mode, depending on the environment. It is noted that by executing resource scripts 160 to either obtain resource parameters or to create clone resource processes 164, kernel 152 may be able to provide a more accurate preview of the reboot process by executing resource scripts 160 using the same code as during an actual reboot.

In step 402, kernel 152 may bypass one or more system calls which would otherwise modify the state of computer system 100. Specifically, in one embodiment the kernel may avoid altering one or more kernel-level data structures 154 which describe the current configuration of computer system 100.

In step 404, the kernel compares the one or more parameters intended for the bypassed system calls to data structures 154 which describe the current configuration of computer system 100. In one embodiment the data structures 154 may be compared with the withheld parameters to see if the values in the data structure are precisely equal to the parameters, while in another embodiment the data structures 154 may be compared with the parameters within certain tolerances. For example, in one embodiment a file system data structure 154 may list each file system mounted on computer 100. In step 402, kernel 152, while executing in preview mode, may bypass one or more system calls intended to enter information on a newly mounted file system in the file system data structure 154. Then, in step 404, the kernel may determine if the file system data structure 154 contains the parameters on the newly mounted file system.

If, in step 406, unacceptable discrepancies are determined to exist between the existing data structures 154 and the bypassed system call parameters, kernel 152 advances to step 408 and notifies an end user such as a system administrator of the configuration error. Alternatively, if no unacceptable discrepancies are determined to exist, the method may end.

Figure 5:
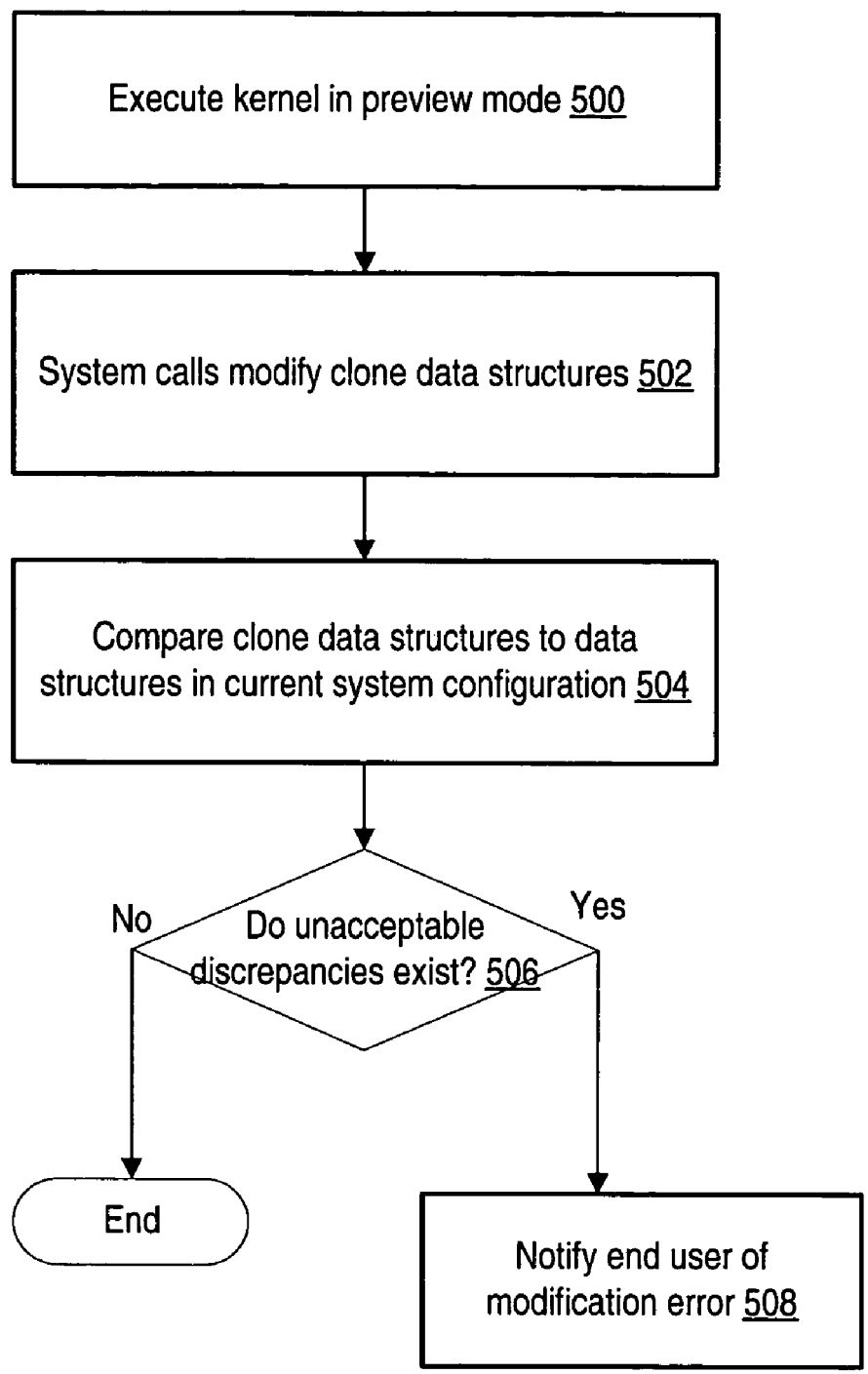
FIG. 5 is a flowchart illustrating previewing of a reboot with the use of a kernel running in preview mode, according to another embodiment.

Turning now to FIG. 5, still another embodiment of a method for previewing a reboot process is illustrated. As described above in FIG. 4, computer system 100 may execute kernel 152 in preview mode to compare the current configuration of the computer system to a speculative post-reboot configuration. However, in one embodiment kernel 152 may modify clone data structures 156 rather than bypassing system calls. By modifying clone data structures 156, kernel 152 may be more easily able to compare a speculative post-reboot configuration to the current configuration of computer system 100. Furthermore, a clone data structure 156 may be able to more accurately reflect an evolving configuration created by multiple system calls, as will be described in further detail below.

In step 500, kernel 152 executes in preview mode much as described in FIG. 4, step 400. In step 502, kernel 152 utilizes a system call to modify a clone data structure 156. As described above, in one embodiment a clone data structure 156 may have an identical structure to a data structure 154. Accordingly, while executing in preview mode kernel 152 may execute the same system call with the same parameters as when executing in non-preview mode, but may modify one or more clone data structures 156 rather than the corresponding kernel data structures 154.

In step 504, kernel 152 compares the clone data structures 156 to the existing data structures 154. In one embodiment the clone data structures 156 and the data structures 154 may be compared for precise equality, while in other embodiments the data structures may be compared within certain predefined tolerances. For example, in one embodiment the kernel may determine that a clone file system data structure 156 contains information on the same mounted file systems as a corresponding file system data structure 154, but in a different order.

Accordingly, if, in step 506, unacceptable discrepancies are determined to exist between data structures 154 and clone data structures 156, kernel 152 advances to step 508 and notifies an end user such as a system administrator of the configuration error. Alternatively, if not unacceptable discrepancies are determined to exist, the method may end.

Figure 6:
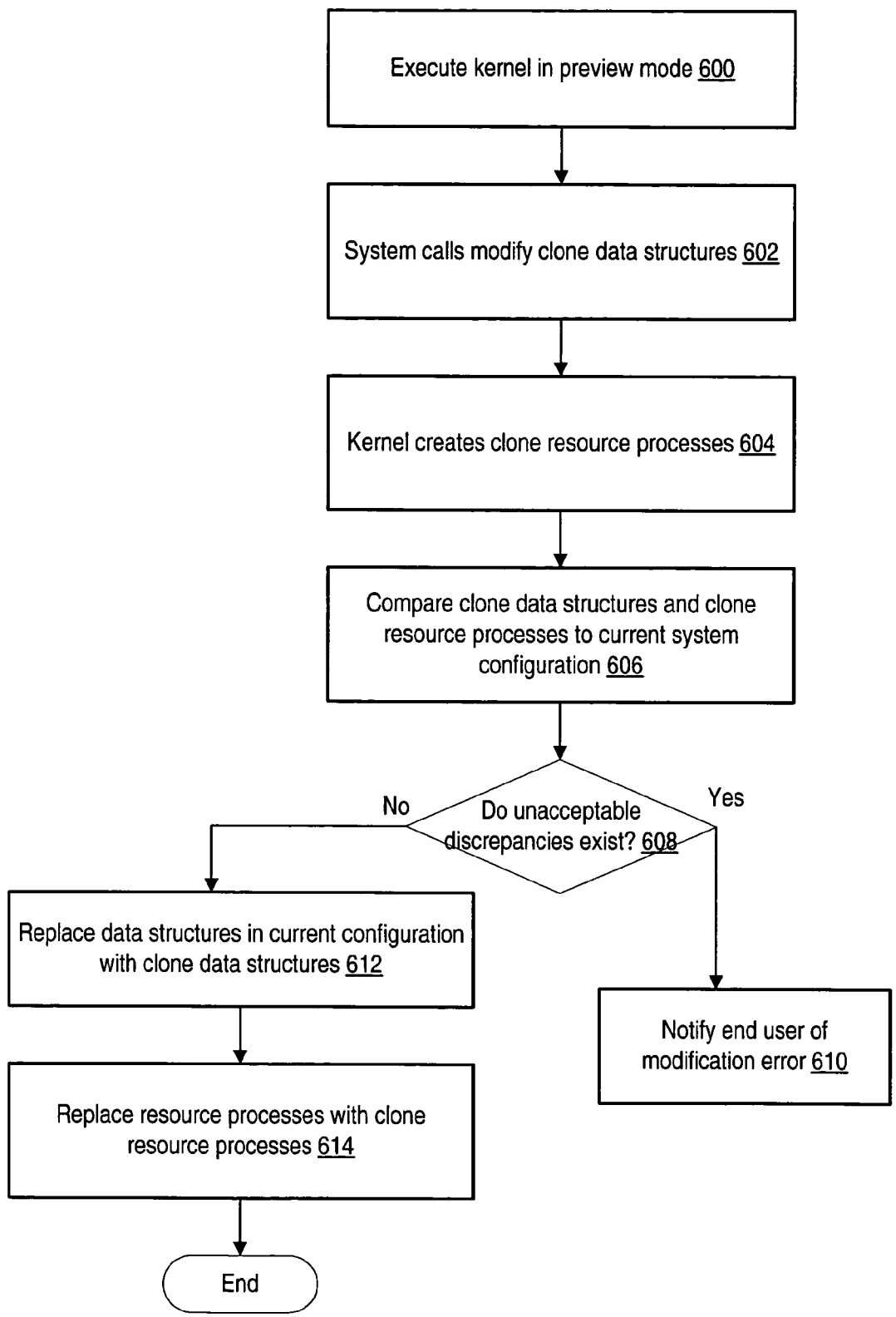
FIG. 6 is a flowchart illustrating previewing of a reboot with the use of a kernel running in preview mode, according to yet another embodiment.

FIG. 6 illustrates another embodiment of a method for previewing a reboot process. As described above in FIG. 5, in one embodiment kernel 152 may create and modify one or more clone data structures 156 which may be compared to one or more data structures 154. Furthermore, as described above in FIG. 3, in one embodiment kernel 152 may create one or more clone resources processes 164 which may be compared to one or more resource processes 162.

Accordingly, it is noted that in a further embodiment, kernel 152 may be operable to substitute clone data structures 156 for the one or more data structures 154, and to substitute the one or more clone resource processes 164 for the one or more resource processes 162, thereby effectively completing a reboot of computer system 100 without having to restart the computer, as will be described in further detail below.

In step 600, kernel 152 executes in preview mode as described above in step 400 of FIG. 4. In step 602, the kernel utilizes one or more system calls to modify clone data structures 156, as described above in step 502 of FIG. 5. In step 604, the kernel creates one or more clone processes 164 by calling one or more resource scripts 160, as described above in step 300 of FIG. 3.

In step 606, the kernel compares the clone data structures 156 and the clone resource processes 164 to data structures 154 and resource processes 162, respectively, as described above in FIGS. 3 and 5. If, in step 608, unacceptable discrepancies are detected between the clone data structures 156 and data structures 154 or clone resource processes 164 and resource processes 162, the kernel advances to step 610 and notifies an end user, such as a system administrator, of the error.

Alternatively, if, in step 608, no unacceptable discrepancies are detected, kernel 162 advances to step 612, wherein the kernel replaces data structures 154 with clone data structures 156. The kernel may then advance to step 614, wherein the kernel replaces the resource processes 162 with clone resource processes 164. The method may then end, thereby completing an effective reboot of computer system 100 without the need for a system restart.

It is noted that in one embodiment replacing data structures 154 with clone data structures 156 may comprise a protected memory operation which may temporarily interfere with the execution of one or more user processes. In one embodiment replacing resource processes 162 with clone resource processes 164 may comprise terminating resource processes 162 and reassigning the workload of resource processes 162 to clone resource processes 164. Alternatively, in another embodiment replacing resource processes 162 with resource processes 164 may comprise terminating both resource processes 162 and clone resource process 164 and restarting new resource processes 162 according to the configuration parameters used by clone resource processes 164. It is further noted that in one embodiment kernel 152 may only replace only those data structures 154 or resource processes 162 which differ from clone data structures 156 and clone resource processes 164.

Figure 7:
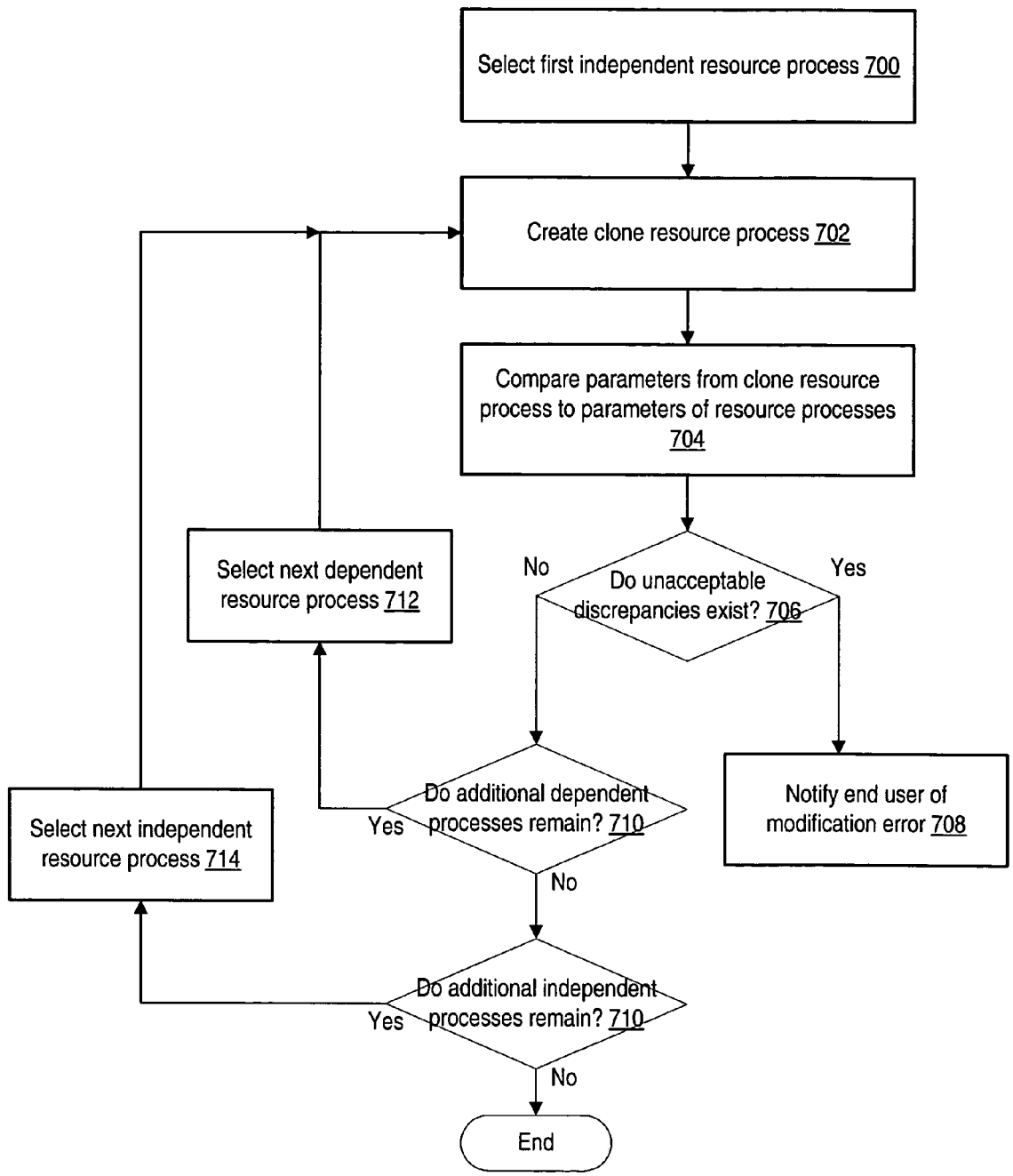
FIG. 7 is a flowchart illustrating previewing of a reboot with the use of a clone resource process, according to another embodiment.

Turning now to FIG. 7, another embodiment of a method for previewing a reboot process is shown. Specifically, FIG. 7 illustrates a method wherein clone resource processes 164 are created and evaluated in comparison to resource processes 162 based on dependency graph 166. As described above, dependency graph 166 may be operable to indicate which clone resource processes 164 must be running for other clone resource processes 164 to be successfully initiated. In step 700, a first independent clone resource process 164 (i.e., a clone resource process may be started without requiring any other clone resource processes to be executing) is selected based on resource graph 166. In one embodiment, there may only be a single independent clone resource process 164, while in other embodiments, there may be a plurality of independent clone resource processes 164.

In steps 702 and 704, the selected clone resource process 164 is started and compared to a corresponding resource process 162, as described in steps 300 and 302 of FIG. 3. If, in step 706, unacceptable discrepancies are detected between the clone resource process 164 and the resource process 162, the method moves to step 708 and an end user, such as a system administrator, is notified. Alternatively, if, in step 706, no unacceptable discrepancies are detected, the method advances to step 710, wherein it is determined if any further clone resource processes 164 remain to be started which are dependent on any previously started clone resource processes 164, in accordance with dependency graph 166. If so, the method advances to step 712, where the next dependent clone resource process 164 is selected, and the method returns to step 702.

If no additional resource processes remain, the method advances to step 714, wherein it is determined if any further independent clone resource processes 164 remain to be started. If so, the method advances to step 716, wherein the next independent clone resource process 164 is selected, and the method returns to step 702. If no additional independent clone resource processes 164 remain to be started, the method ends.

Figure 8:
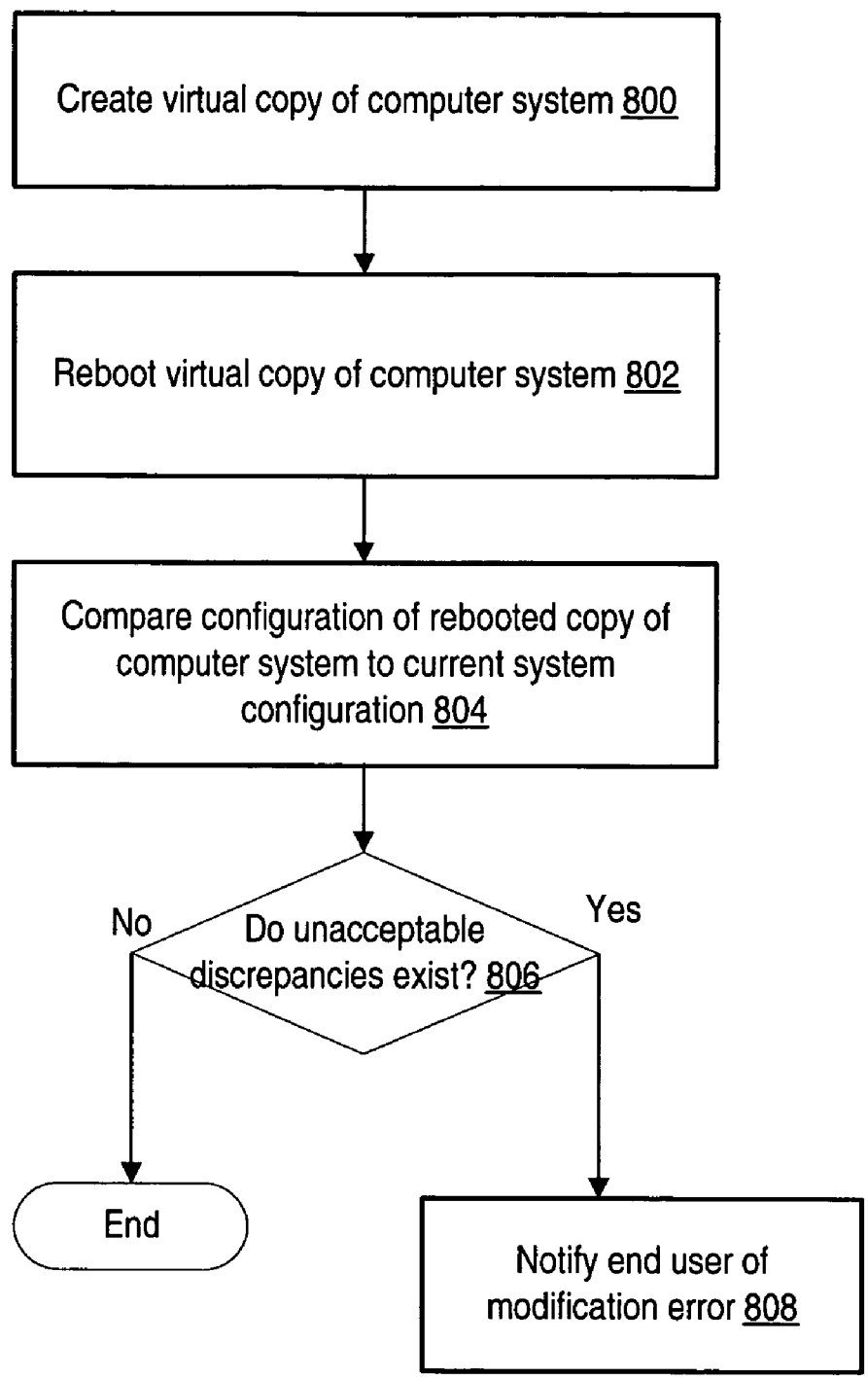
FIG. 8 is a flowchart illustrating previewing of a reboot with the use of a virtual copy of the computer system, according to one embodiment.

It is noted that by selecting and starting clone resource processes 164 according to dependency graph 166, the method described above in FIG. 7 may be able to more efficiently detect any configuration errors which might effect resource processes 162 after a reboot. For example, in one embodiment the method may only test specific resource processes 162 which might be affected by a configuration change, as well as the resource processes 162 dependent on that resource, thereby avoiding the creation of unnecessary clone resource processes 164. As described above in FIG. 3, the steps of FIG. 7 may be carried out in a systematic manner by operating system 150, while in other embodiments the method may be executed by a system utility or by a system administrator on a resource-by-resource basis. It is also noted that in one embodiment clone resource processes 164 may continue to be created and compared to existing resource processes 162 even after an unacceptable discrepancy is detected and an end user is notified Turning now to FIG. 8, still another embodiment of a method for previewing a reboot process is illustrated. Specifically, in some embodiments computer system 100 may utilize system copy 168 to observe in full detail what may happen during the course of a reboot without affecting system availability. In step 800, system copy 168 is created utilizing the current configuration of computer system 100. In one embodiment system copy 168 may be created and executed on the same computer system 100, while in another embodiment system copy 168 may be created and executed on an identical computer system 100 in a cluster.

In step 802, system copy 168 is rebooted. It is noted that in one embodiment system copy 168 may be completely rebooted while executing on an identical computer system 100. Alternatively, in another embodiment system copy 168 may simulate a reboot without restarting the underlying hardware.

In step 804, the configuration of the rebooted system copy 168 is compared to the current configuration of computer system 100. In one embodiment the configurations may be compared for precise equality, while in another embodiment the configurations may be compared for equality within certain predefined tolerances. For example, in one embodiment system copy 168 may contain certain additional functionality in comparison to computer system 100 as the result of a configuration change. If unacceptable discrepancies are detected between the configuration of system copy 168 and the current configuration of computer system 100, the method may advance to step 806, wherein an end user, such as a system administrator, is notified. Alternatively, if no unacceptable discrepancies are detected, the method may end.

It is noted that in one embodiment the current configuration of computer system 100 may be terminated and system copy 168 may take over for the terminated configuration, thereby allowing for an effective reboot of system 100 without affecting system availability. It is also noted that in one embodiment the steps of FIG. 8 may be carried out in a systematic manner by operating system 150, while in another embodiment the method may be executed by a system administrator.

Various embodiments may further include receiving, sending or storing instructions and/or data that implement the operations described above in conjunction with FIGS. 1-8 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   modifying a configuration of a computer system in a hardware platform;
   previewing a reboot;
   wherein previewing the reboot comprises comparing a current configuration of the computer system to a predicted configuration of the computer system;
   wherein previewing the reboot further comprises:
      initiating one or more clone resource processes; and
      comparing the one or more clone resource processes to one or more resource processes; and
   wherein the method further comprises:
      executing an operating system kernel in a preview mode, wherein executing the kernel in the preview mode comprises:
         executing one or more system calls, wherein the one or more system calls modify one or more clone data structures; and
         comparing the one or more clone data structures to data structures in the current configuration of the computer system; and
   wherein the one or more clone processes are initiated by the operating system kernel executing in the preview mode; and
   wherein the method further comprises:
      replacing the data structures in the current configuration with the clone data structures; and
      replacing the one or more resource processes with the one or more clone resource processes.

2. The method of claim 1, wherein initiating one or more clone resource processes comprises:
   determining one or more dependent clone resource processes that are dependent on one or more independent clone processes based on a dependency graph;
   initiating the one or more independent clone processes;
   initiating the one or more dependent clone processes.

3. The method of claim 1, further comprising determining errors in the current configuration of the computer system by comparing the current configuration of the computer system to the predicted configuration of the computer system.

4. A computer system in a hardware platform comprising a modifiable configuration, wherein the computer system is configured to preview a reboot, wherein previewing the reboot comprises comparing a current configuration of the computer system to a predicted configuration of the computer system; and wherein the computer system is further configured to:
        initiate one or more clone resource processes corresponding to one or more resource processes; and
        compare the one or more resource clone processes to the one or more resource processes; and
    wherein the computer system further comprises:
        an operating system kernel configured to execute in a preview mode, wherein executing the kernel in the preview mode comprises:
        executing one or more system calls, wherein the one or more system calls modify one or more clone data structures; and
        comparing the one or more clone data structures to data structures in the current configuration of the computer system; and
    wherein the one or more clone resource processes are initiated by the operating system kernel executing in the preview mode; and
    wherein the computer system is further configured to:
        replace the data structures in the current configuration with the clone data structures; and
        replace the one or more resource processes with the one or more clone resource processes.

5. The computer system of claim 4, wherein initiating one or more clone resource processes comprises:
    determining one or more dependent clone resource processes that are dependent on one or more independent clone processes based on a dependency graph;
    initiating the one or more independent clone processes;
    initiating the one or more dependent clone processes.

6. The computer system of claim 4, wherein the computer system is further operable to determine errors in the current configuration of the computer system by comparing the current configuration of the computer system to the predicted configuration of the computer system.

7. A computer readable storage medium including program instructions executable to implement a method comprising:
    modifying a configuration of a computer system;
    previewing a reboot, wherein previewing the reboot comprises comparing a current configuration of the computer system to a predicted configuration of the computer system; and
    wherein previewing the reboot further comprises:
        initiating one or more clone resource processes; and
        comparing the one or more clone resource processes to one or more resource processes; and
    wherein the method further comprises:
        executing an operating system kernel in a preview mode, wherein executing the kernel in the preview mode comprises:
        executing one or more system calls, wherein the one or more system calls modify one or more clone data structures; and
        comparing the one or more clone data structures to data structures in the current configuration of the computer system; and
    wherein the one or more clone processes are initiated by the operating system kernel executing in the preview mode; and
    wherein the method further comprises:
        replacing the data structures in the current configuration with the clone data structures; and
        replacing the one or more resource processes with the one or more clone resource processes.

8. The computer readable storage medium of claim 7, wherein initiating one or more clone resource processes comprises:
    determining one or more dependent clone resource processes that are dependent on one or more independent clone processes based on a dependency graph;
    initiating the one or more independent clone processes;
    initiating the one or more dependent clone processes.

9. The computer readable storage medium of claim 7, wherein the method further comprises determining errors in the current configuration of the computer system by comparing the current configuration of the computer system to the predicted configuration of the computer system.

\* \* \* \* \*